United States Patent [19]
Taylor

[11] 3,812,882
[45] May 28, 1974

[54] RESTRICTOR VALVE

[76] Inventor: Julian S. Taylor, 8300 S.W. 8, Oklahoma City, Okla. 73108

[22] Filed: Jan. 2, 1973

[21] Appl. No.: 320,014

[52] U.S. Cl. ............... 137/556.6, 251/208, 251/304
[51] Int. Cl. ......................... F16k 37/00, F16k 5/12
[58] Field of Search..... 137/625.41, 625.46, 625.45; 251/208, 304, 124

[56] References Cited
UNITED STATES PATENTS

| | | | |
|---|---|---|---|
| 567,200 | 9/1896 | Senna | 251/304 |
| 1,023,903 | 4/1912 | Weiss | 137/625.46 X |
| 1,249,601 | 12/1917 | DeFerranti | 251/124 X |
| 3,511,471 | 5/1970 | Rossi | 251/304 X |
| 3,630,484 | 12/1971 | Taylor | 251/208 |

FOREIGN PATENTS OR APPLICATIONS

| | | | |
|---|---|---|---|
| 23,546 | 12/1900 | Great Britain | 251/304 |
| 25,599 | 2/1902 | Switzerland | 251/208 |

*Primary Examiner*—Henry T. Klinksiek
*Attorney, Agent, or Firm*—Robert K. Rhea

[57] ABSTRACT

In a restrictor valve housing, having a flow passageway, a pair of plates having aligned orifices intersect the flow passageway within the housing and define an intermediate portion of the flow passageway. A central disk, interposed between the pair of plates, is provided with an opening mating and mismating with the axis of the flow passageway by axial rotation of the disk. An operating ring, secured to the periphery of the central disk, projects outwardly of a portion of the outer limit of the housing permitting manual rotation of the central disk. Indicia, scored on the operating ring, provides visual indication of the position of the central disk opening with respect to the orifices in the pair of plates.

6 Claims, 10 Drawing Figures

PATENTED MAY 28 1974 3,812,882
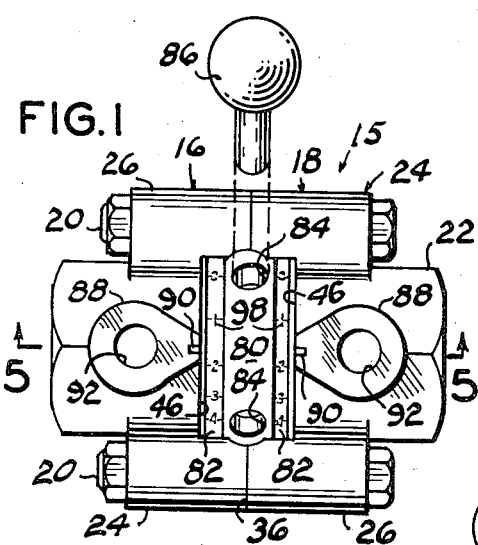
FIG.1
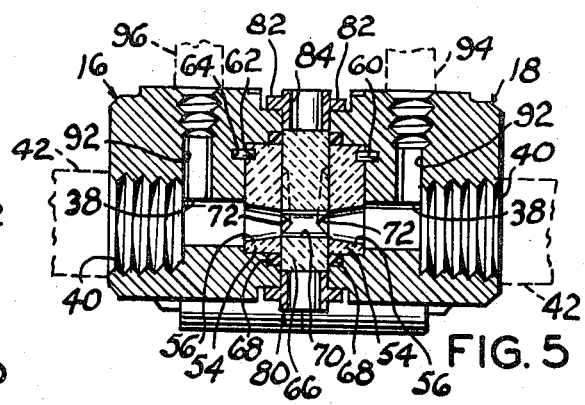
FIG.5
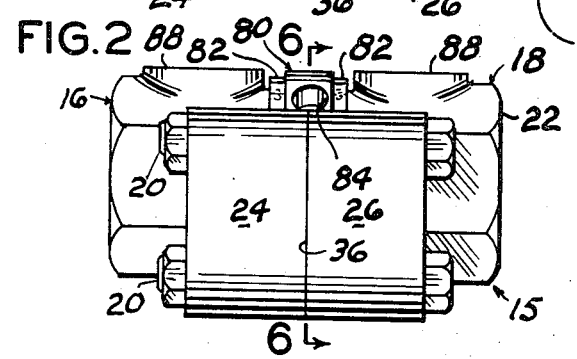
FIG.2
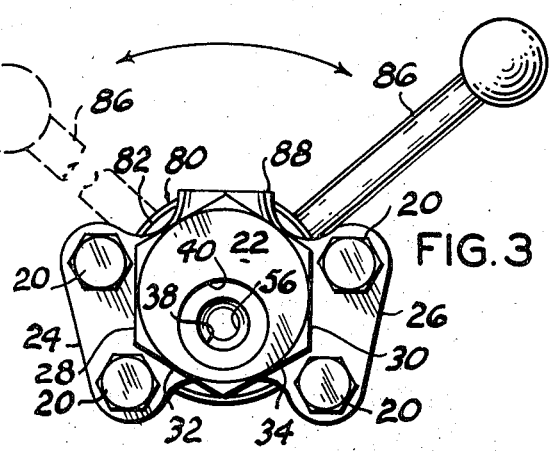
FIG.3
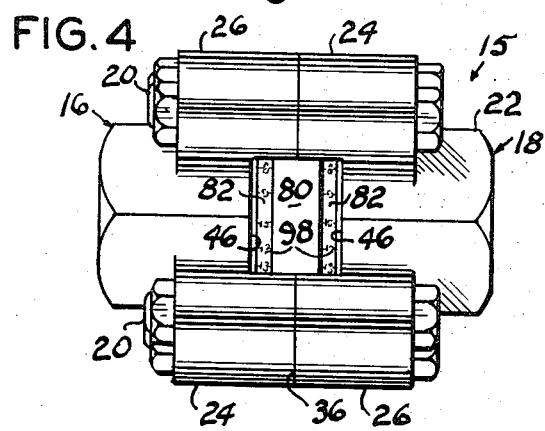
FIG.4
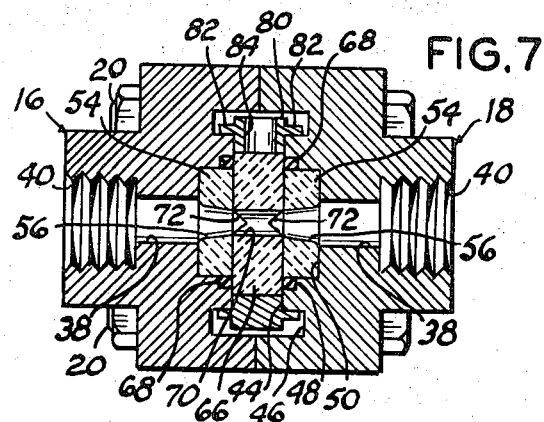
FIG.7
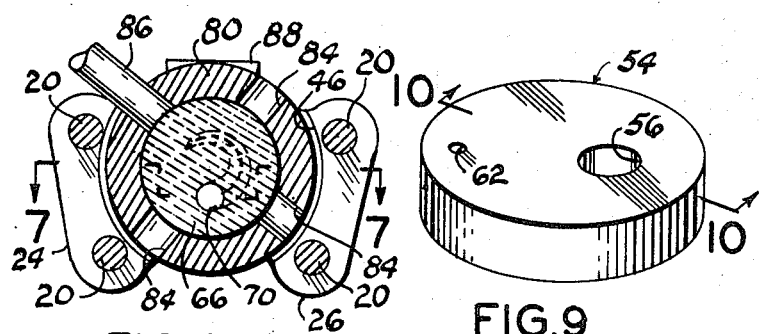
FIG.6  FIG.9  FIG.8
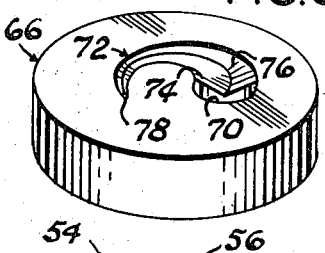
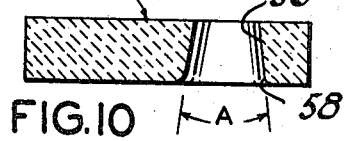
FIG.10

RESTRICTOR VALVE

BACKGROUND OF THE INVENTION

1. Field of the Invention

The present invention relates to flow restrictor valves commonly referred to as orifice valves and more particularly to a multiple stage plate and disk valve for controlling the flow rate of fluids containing abrasive materials.

The present invention has particular application in the control of oil well production fluids to control the rate of flow through a flow line, or the like. Heretofore such orifice valves have usually comprised one or more orifices in a stationary disk and a rotatable disk having one or more orifices, which may be brought into and out of alignment with the orifices in the stationary disk. As the rotatable disk is moved angularly to restrict the flow through the orifices to a comparatively small volume, it has been found that the relatively high fluid velocity generated by well head pressure will cause erosion within the orifice valve assembly, either within the assembly itself or downstream from the downstream orifice plate. Such erosion has in part been avoided by use of erosion resistant material, such as tungsten carbide or ceramic materials, however, even these hard materials are subject to erosion thus shortening the life of the valve.

This invention involves recognition of the problem of erosion caused by the high velocity streams of erosive fluids, such as crude oil containing sand in suspension, and also the erosive problem caused by the angular direction of the high velocity flow through partially closed orifices which results in high velocity stream impinging on knife-like edges of partially mating orifices to cause a tremendous pressure drop over a very short distance. Changes in direction of flow of such fluids as a result of passing through partially mismated orifices usually results in the fluid, by its abrasive action, "cutting" away portions of the metal forming the body of conventional restrictor valves. This invention dissipates fluid stream energy over a relatively long flow passage, when compared with the thickness of the disk containing the flow passageway, with both restriction and direction of flow change.

2. Description of the Prior Art

The most pertinent prior patent is my Pat. No. 3,630,484 which similarly discloses a pair of fluid orifice plates having a rotatable disk interposed therebetween.

The principal distinction between this invention and the above numbered patent is the elimination of the gear means for rotating the central disk, thus reducing the cost of manufacture. The provision of a manually moved operating ring and arrangement of components permits visual inspection of indicia indicating the position of the central disk orifice, while it is being rotated, with respect to the orifices in the plates.

This invention further reduces the abrasive action of the valve body by fluids flowing through the valve by the position and configuration of the orifice openings in the pair of plates.

SUMMARY OF THE INVENTION

A valve body is provided with a flow passageway with the axis of the flow passageway off-set with respect to the longitudinal axis of the valve body. A pair of plates, having orifices therethrough aligned with the flow passageway, is positioned in parallel spaced relation within the valve body. A rotatable disk is interposed between the pair of plates and is provided with an orifice rotatable into and out of alignment with the orifices in the pair of plates. The rotatable disk is further provided with arcuate substantially V-shaped inclined grooves on its respective opposing end faces cooperatively formed on a radius complemental with the radius of rotation of the rotatable disk orifice and in communication therewith. These grooves are characterized by the bottom of their V-shape, beginning on an incline in the plane of the respective end of the rotatable disk and converging toward each other. Thus, the erosive effect of high velocity fluids flowing through the orifices is directed against the faces forming the upstream groove on the central disk wherein, during the life of the valve, any resultant erosion of the central disk may be compensated for by rotating the disk so that the smaller end portion of the upstream groove intersects the stream of fluid.

An operating ring surrounds the central disk and has a portion of its periphery projecting outwardly beyond the outer limit of a portion of the valve body and provided with radially spaced sockets for receiving a manually operated handle and rotating the central disk through an arc of at least 60°.

Indicia, scored on the operating ring, is co-ordinated with the central disk orifice and grooves for visually indicating the mating or mismating position of the central disk orifice and its grooves with respect to the orifices in the plates. A lateral bore, formed in the respective end portion of the body and intersecting the flow passageway, provides an instrument receiving means for determining pressure drop in the flow passageway across the position of the orifice plates and central disk.

The principle object of this invention is to provide a flow restrictor valve having multiple disks provided with mating and mismating orifices including grooves formed on opposite end surfaces of a central rotatable disk for regulating flow rate through the valve.

BRIEF DESCRIPTION OF THE DRAWINGS

FIG. 1 is a top view of the valve illustrating, by solid and dotted lines, the position of a manually operated operating handle;

FIG. 2 is a side elevational view of FIG. 1 with the operating handle removed;

FIG. 3 is an end view illustrating, by dotted lines, the limit of movement of the operating handle;

FIG. 4 is a bottom view;

FIG. 5 is a vertical cross-sectional view taken substantially along the line 5—5 of FIG. 1 and illustrating, by dotted lines, the relative position of tubing when connected with threaded openings in the valve;

FIG. 6 is a vertical cross-sectional view, partially in elevation, taken substantially along the line 6—6 of FIG. 2 and illustrating a fragment of the operating handle connected therewith;

FIG. 7 is a horizontal cross-sectional view taken substantially along the line 7—7 of FIG. 6;

FIG. 8 is a perspective view, to a larger scale, of the central disk, per se;

FIG. 9 is a similar perspective view of one of the orifice plates; and,

FIG. 10 is a vertical cross-sectional view taken substantially along the line 10—10 of FIG. 9.

DESCRIPTION OF THE PREFERRED EMBODIMENT

Like characters of reference designate like parts in those figures of the drawings in which they occur.

In the drawings:

The reference numeral 15 indicates the valve, as a whole, comprising a two-part housing or body indicated at 16 and 18. The body parts or halves 16 and 18 are identical and are connected together by a plurality of bolts and nuts 20 extending through aligned apertures. In the interest of brevity, only the body 18 will be described in detail. In the example shown, the body 18 is substantially hexagonal-shaped in general configuration, as at 22, and is provided with laterally projecting lugs 24 and 26 extending across opposing flats 28 and 30 of the hexagonal-shape and partially across adjacent flats 32 and 34 in a partial wrap-around configuration. It is these lugs 24 and 26 which are line drilled parallel with the axis of the hexagonal-shape for receiving the bolts and nuts 20. The other end of the body half 18 is provided with a flat surface or face 36 which mates with a similar face on the body half 16 when the two halves are assembled by the bolts and nuts 20. The body 18 is longitudinally drilled to form a flow passageway therethrough, as at 38, in downwardly off-set or eccentric relation with respect to the longitudinal axis of the body 18, as viewed in FIGS. 3 and 5, for the purposes presently explained.

The body 18 is counterbored from its end opposite the face 36 and threaded, as at 40, for coaxially receiving an end portion of a flow pipe 42. The body face or surface 36 is step diameter coaxially counterbored, as at 44, 46, 48 and 50. The diameter of the counterbore 44 is at least as great as the distance across opposing points of the hexagonal-shape 22 so that this counterbore 44 is open to the periphery of the hexagonal-shape across its flats and beyond the limits of points of the hexagonal-shape, as viewed in FIG. 5. The counterbore 46 forms a groove in the periphery of the body between and through the respective bolt receiving lug 24 and 26 for the purpose presently explained.

A pair of cylindrical disks or orifice plates 54, each formed of hard erosive resistant material, such as ceramic, are positioned respectively within the flow passageway counterbore 50 of the body halves 16 and 18 and transversely span the bore forming the flow passageway. The plates 54 are each provided with an opening or orifice 56 eccentrically disposed with respect to the axis of the plate and coaxially aligned with the flow passageway. The orifice 56 is defined by an inclined wall converging toward the opposite plate wherein the included angle A of convergence is substantially 15° (FIG. 10). The surface of the respective plate 54 facing toward the threaded bore 40 is provided with an arcuate edge 58 (FIG. 10) merging with the wall forming the orifice 56 for minimizing abrasive action of erosive fluids flowing through the passageway. The plates 54 are maintained stationary with respect to the respective body half by a pin 60 extending into a socket 62 formed in the respective plate and a cooperating socket 64 formed in the respective body half.

A central rotatable orifice plate or disk 66 similarly formed of hardened material, such as ceramic, and having a diameter preferably slightly greater than the diameter of the counterbore 48 is concentrically interposed between the plates 54 in face to face contiguous contact therewith. An O-ring 68 is disposed within the body counterbore 48 and provides a fluid tight seal between the central disk 66 and respective plate 54 and with the respective body halves 16 and 18. The central disk 66 is provided with an opening or orifice 70 diametrically substantially equal to the smaller end of the plate orifice 56 and similarly disposed eccentrically with respect to the axis of the disk 66 and rotatable into and out of mating relation with respect to the orifices 56 by axial rotation of the disk 66 as presently explained.

Each end face of the disk 66 is provided with a groove 72 characterized by inwardly converging side surfaces 74 and 76 forming a substantial V-shape communicating, at one end with the orifice 70 and tapering outwardly toward the respective end face of the disk 66 on a relatively constant radius, equal to the radius between the axial center of the disk 66 and the axis of its orifice 70, and terminating substantially 180° to 270° from the axis of the orifice 70. The groove 72 thus defines a spacing between the end 78 of the groove and the periphery of the orifice 70 great enough to encompass or cover the orifices 56 of the stationary plates 54 and form a stop when desired.

The periphery of the disk 66 is bonded to an operating ring 80 loosely nested by the counterbore 44. The operating ring 80 is characterized by integral oppositely disposed ring-like flanges 82 adjacent its periphery which are freely rotatable within the counterbore 46 and maintain the disk 66 concentric with the plates 54 by contact with one wall surface forming the counterbore 46. Diametrically the operating ring 80 is at least equal to the diameter of the hexagonal-shaped body 22 across its points thus exposing a peripheral arc of at least 80° of the circumference of the operating ring and its respective flanges 82 between the uppermost position of the bolt lugs 24 and 26, as viewed in FIGS. 1 and 3. The operating ring 80 is provided with a plurality, four in the example shown, of radially spaced apertures forming sockets 84 for receiving one end portion of a rod-like control handle 86 for rotating the disk 66 about its axis for mating and mismating its orifice 70 with the orifice 56 of the plates 54.

Each body half is provided with an upstanding projection or boss 88 having a flat upper surface, as viewed in the drawings, substantially teardrop-shaped in top view (FIG. 1) with its tip or converging end pointing toward the opposite body half and terminating adjacent the counterbore 46. The tip end of the boss 88 is provided with an indicator or recess 90 aligned with the axis of the flow passageway. The boss 88 is centrally drilled and threaded, as at 92, perpendicular to the axis of the body bore 38 and intersecting the latter. The purpose of the bores 92 is for receiving pressure reading instruments, such as pressure gauges, neither of which is shown, which are connected with each threaded bore 92 by tube members 94 and 96 for obtaining upstream and downstream pressure readings to determine fluid flow through the valve 15. Pressure differential obtained by pressure gauges, or the like, thus permits calculation of the rate of fluid flow through the valve if the valve setting or equivalent orifice diameter is known.

Suitable indicia, preferably a progression of numerals 98, are printed or scored on the periphery of each operating ring flange 82 indicating equivalent square edge orifice openings. The spacing between the indicia 98 is calibrated with the position of the disk orifice 70, its grooves 72 and the orifices 56 of the plates so that the indicia 98, when aligned with the indicators 90, visually indicates to the operator the equivalent size of the opening provided through the plates and disk.

OPERATION

Obviously, fluid may flow through the valve passageway in either direction. Assuming the valve body 18 is the upstream end, the threaded bores 40 are connected with or is interposed in the pipe 42, the operating ring 80 may then be manually rotated by inserting one end of the handle 86 into one of the sockets 84 and rotating the disk about its axis in a desired direction guided by the indicia 98 to mate or mismate the disk orifice 70 with the plate orifice 56 or position the grooves 72 in intersecting relation with respect to the plate orifices 56. Similarly the disk may be rotated so that the disk orifice 70 and its grooves are mismated with the plate orifices 56 thus forming a stop interrupting fluid flow through the valve 15. In using the valve as a fluid flow restrictor, fluid under pressure of many atmospheres, impinges on the upstream groove surfaces and passes through the disk by entering its orifice 70 and entering the downstream groove and through the orifice 56 of the downstream plate. Thus, a restriction and tortuous path is formed for the fluid which eliminates erosion of the plates and disk by eliminating knife-like edges usually formed by circular orifices partially mismated in restrictor valves.

Relatively large diameter restrictor valves are preferably formed from cylindrical stock with connecting bolt lugs attached to the respective body half in substantially the position shown by the position of the bolts 20.

Obviously the invention is susceptible to changes or alterations without defeating its practicability, therefore, I do not wish to be confined to the preferred embodiment shown in the drawings and described herein.

I claim:
1. A restrictor valve, comprising:
a valve body having a flow passageway including an inlet leading
to said passageway and an outlet leading from said passageway,
said body having counterbores intersecting and spanning the passageway and having a groove in its periphery surrounding the counterbores;
a pair of stationary plates disposed within the counterbores in parallel spaced-apart relation,
each said plate having an orifice coaxially aligned with the passageway;
a rotatable disk interposed between said plates,
said disk having an orifice movable into and out of registration with the orifices of said plates for controlling the flow of fluid through the passageway,
said rotatable disk having end faces respectively contiguously contacting the respective said plate,
each said end face having a flow restricting inclined groove having a length at least equal to the diameter of the disk orifice formed therein communicating, at one end with the orifice in said disk and terminating, at its other end, in the plane of the respective end face for changing the direction of a stream moving through the passageway when said rotatable disk orifice is out of registration with the orifices in said plates; and,
an operating ring secured to the periphery of said disk within the body groove for maintaining said disk concentric with said plates,
said ring projecting outwardly beyond a peripheral portion of said body for manually rotating said disk.
2. The restrictor valve according to claim 1 in which:

said operating ring is provided with a plurality of radially spaced sockets open to its periphery; and,
handle means engageable with the operating ring sockets.
3. The restrictor valve according to claim 1 in which the
inclined grooves in said end faces are disposed in opposite alignment; and are formed on a radius common to the radial spacing between the axis of said disk and the axis of the orifice in said disk.
4. The restrictor valve according to claim 3 and further including:
registration means visually indicating the relative position of the inclined grooves and the orifice in said disk with respect to the passageway.
5. The restrictor valve according to claim 1 in which:

the orifice in each said stationary plate is characterized by a truncated conical surface diverging in a direction opposite said disk.
6. The restrictor valve according to claim 5 in which:

the diverging orifice forming surface of each stationary plate terminates, adjacent its greater diameter, in an arcuate surface merging with a plane normal to the axis of the orifice.

* * * * *

UNITED STATES PATENT OFFICE
CERTIFICATE OF CORRECTION

Patent No. 3,812,882     Dated May 28, 1974

Inventor(s) Julian S. Taylor

It is certified that error appears in the above-identified patent and that said Letters Patent are hereby corrected as shown below:

On the cover sheet insert -- The portion of the term of this patent subsequent to Dec. 28, 1988, has been disclaimed. --

Signed and sealed this 31st day of December 1974.

(SEAL)
Attest:

McCOY M. GIBSON JR.
Attesting Officer

C. MARSHALL DANN
Commissioner of Patents